(12) United States Patent
Guillo et al.

(10) Patent No.: US 7,681,917 B2
(45) Date of Patent: Mar. 23, 2010

(54) SEALING AND REINFORCING STRIPS PRINCIPALLY FOR AIRBAG ASSEMBLY JOINTS

(75) Inventors: Jean Roger Guillo, Serezin de la Tour (FR); Sophie Roland, Tignieu (FR); Francois Jeanne, Villeurbane (FR); Jean Francois Lecoeuvre, Sorbiers (FR); Jean Marc Obadia, Villfontaine (FR); Benoit Bouquier, Villeurbane (FR)

(73) Assignee: Zodiac Automotive US Inc., Tempe, AZ (US)

( * ) Notice: Subject to any disclaimer, the term of this patent is extended or adjusted under 35 U.S.C. 154(b) by 897 days.

(21) Appl. No.: 11/471,157

(22) Filed: Jun. 20, 2006

(65) Prior Publication Data

US 2006/0292949 A1    Dec. 28, 2006

Related U.S. Application Data

(60) Provisional application No. 60/693,725, filed on Jun. 24, 2005.

(51) Int. Cl.
B60R 21/16        (2006.01)

(52) U.S. Cl. .................................................. 280/743.2
(58) Field of Classification Search ................. 280/729, 280/730.1, 728.1, 730.2, 743.2; 442/183, 442/185, 189, 208
See application file for complete search history.

(56) References Cited

U.S. PATENT DOCUMENTS

| | | | |
|---|---|---|---|
| 6,113,141 | A | 9/2000 | Baker |
| 6,355,123 | B1 | 3/2002 | Baker et al. |
| 6,364,356 | B1 | 4/2002 | Keshavaraj |
| 6,520,539 | B1 | 2/2003 | Ritter |

FOREIGN PATENT DOCUMENTS

| | | |
|---|---|---|
| DE | 10021640 | 11/2000 |
| WO | WO99/14082 | 3/1999 |
| WO | WO01/70543 | 9/2001 |
| WO | WO02/066297 | 8/2002 |

*Primary Examiner*—Arti Singh-Pandey
(74) *Attorney, Agent, or Firm*—Dean W. Russell; Kilpatrick Stockton LLP (57) ABSTRACT

Highly-deformable sealing strips integrating with fabric assemblies (principally of airbags) are detailed. The strips reduce gas leakage from occurring. They also function as mechanical reinforcements of the assemblies.

10 Claims, 11 Drawing Sheets

SEALING AND REINFORCING STRIPS PRINCIPALLY FOR AIRBAG ASSEMBLY JOINTS

REFERENCE TO PROVISIONAL APPLICATION

This application is based on and hereby refers to U.S. Provisional Patent Application Ser. No. 60/693,725, filed Jun. 24, 2005, entitled "Sealing and Reinforcement Strip for Airbag Assembly Joints," the entire contents of which are incorporated herein by this reference.

FIELD OF THE INVENTION

This invention relates to materials for sealing and reinforcing other materials and particularly, although not necessarily exclusively, to highly-deformable strips adapted to seal and reinforce seams and peripheries of vehicle airbags.

BACKGROUND OF THE INVENTION

Conventional airbags frequently comprise multiple panels of fabric cut to particular patterns and assembled at their peripheries by seams. Some such fabric panels are uncoated. Others, including versions provided by the assignee of this application, may be coated with highly-impermeable silicone to reduce leakage of inflation gas through the panels. Reducing gas leakage from an airbag greatly enhances its performance, as pressure within the bag from the gas-generation event may be sustained for longer periods.

U.S. Pat. No. 6,364,356 to Keshavaraj details methods of forming an exemplary inflatable airbag. Panels may be adhered together by welded seams, with the welding purportedly "reducing air or gas permeability." See Keshavaraj, Abstract, ll. 5-6. As described in the Keshavaraj patent, "a single stitched (sewn) seam located adjacent" two welded seams may "provide increased tear strength" for the combined seam structure. See id., col. 6, ll. 8-9 (numeral omitted).

Although utilizing multiple seams for inflatable fabrics may reduce gas permeability of the panels, significant gas leakage may continue to occur. Likewise, although employing multiple seams may provide greater tear strength, as indicated in the Keshavaraj patent, substantial reinforcement of seams may continue to be required. Accordingly, need exists for materials adapted to provide reduced permeability of, and greater strength to, seams of fabric panels.

SUMMARY OF THE INVENTION

The present invention supplies such materials. In particular, the invention provides highly-deformable sealing strips integrating with fabric assemblies to reduce gas leakage from occurring. The strips also function as mechanical reinforcements of the assemblies.

DETAILED DESCRIPTION

Figure 1:
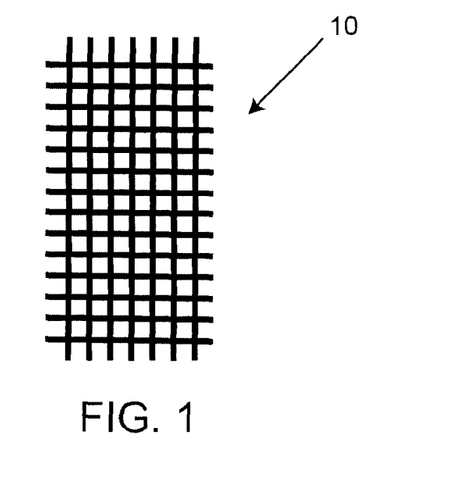
FIG. 1 illustrates a fabric strip with straight gain.

Depicted in FIG. 1 is an exemplary sealing strip 10 of the type currently used in textile constructions of airbags. Strip 10 typically is woven and advantageously may resist processing tension in the warp direction. However, strip 10 often is not highly deformable in the weft direction and thus is unable to conform optimally to geometrically-complex assembly joints.

Figure 2:
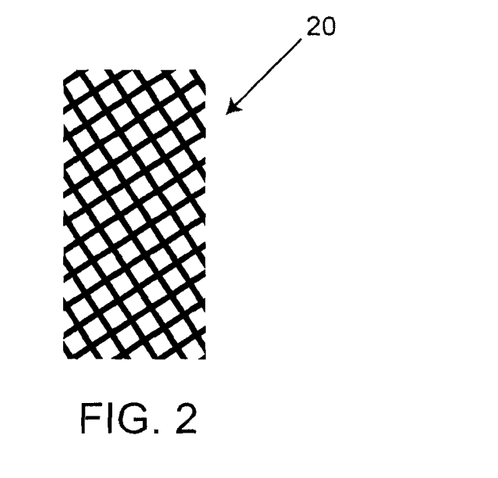
FIG. 2 illustrates a bias strip of fabric.

Presently, therefore, when assembly joints are complex geometrically, strip 20 (FIG. 2) sometimes is used instead. Strip 20 may be cut along the fabric bias to improve deformability in the weft direction. Doing so increases extensibility in the warp direction, however, increasing difficulties when strip 20 is sewn in place. In particular, use of strip 20 at times may cause needle jamming, folds, puckers, or other abnormalities in the associated airbag.

Figure 3:
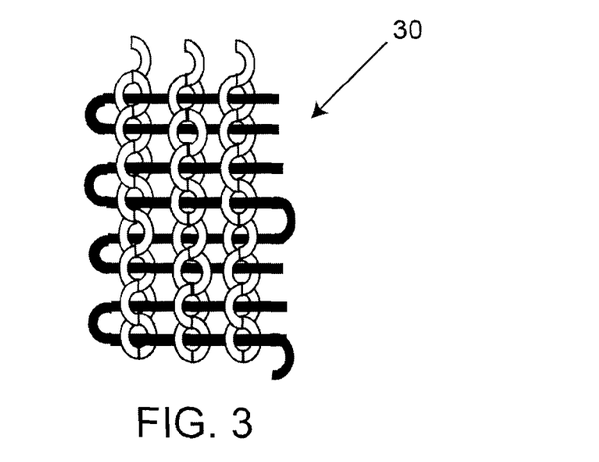
FIG. 3 illustrates a textile structure having low extensibility in the warp direction and high deformation in the weft direction.

FIG. 3 shows strip 30 of the present invention. Strip 30 supplies high deformability in the weft direction without significantly increasing extensibility in the warp direction. Strip 30 preferably is comprised of textile structures made by knitting, warp knitting, braiding, or weaving, although other construction processes may be employed instead.

Figure 4:
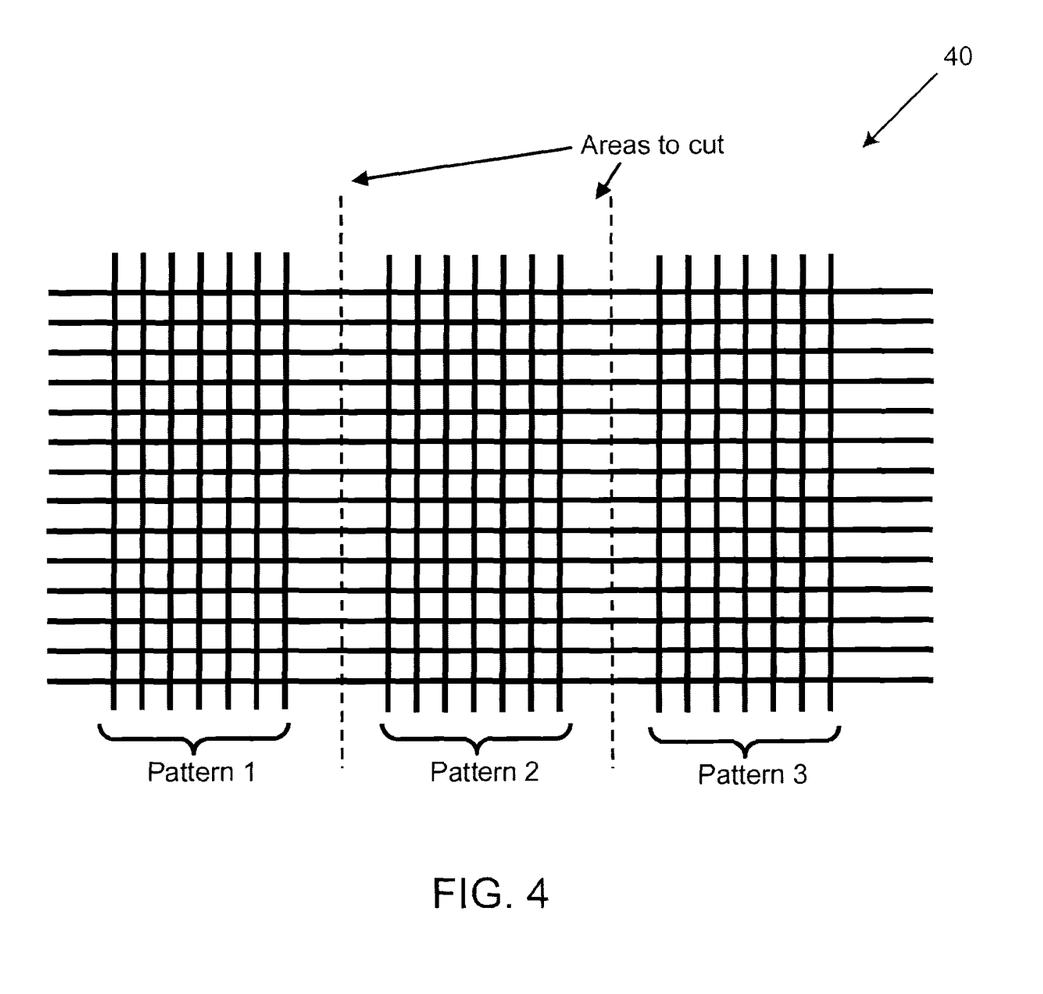
FIG. 4 illustrates a sheet of strips.

Structures of strip 30 also may be composites whose length is inextensible so as to limit deformation in the assembly process. Strips 30 additionally may be cut from a sheet 40, as shown in FIG. 4. Regardless, however, strips 30 may be configured and structured (including via the nature of the threads or fibers employed and the density of the weave, for example) as appropriate for the type of assembly joint to be sealed and to facilitate penetration of adhesives.

Currently, liquid curable silicone polymers sometimes are applied to seams to provide seals. Alternatively, hot (EVC) or cold (EVF) curable elastomeric silicone adhesives may be employed in conventional designs. The former provides no mechanical reinforcement of the sealed joint, while the latter may tend to release toxins, volatile compounds, or odorants over time. As a consequence, the latter may be incompatible for use within, for example, passenger compartments of motor vehicles.

Figure 5:
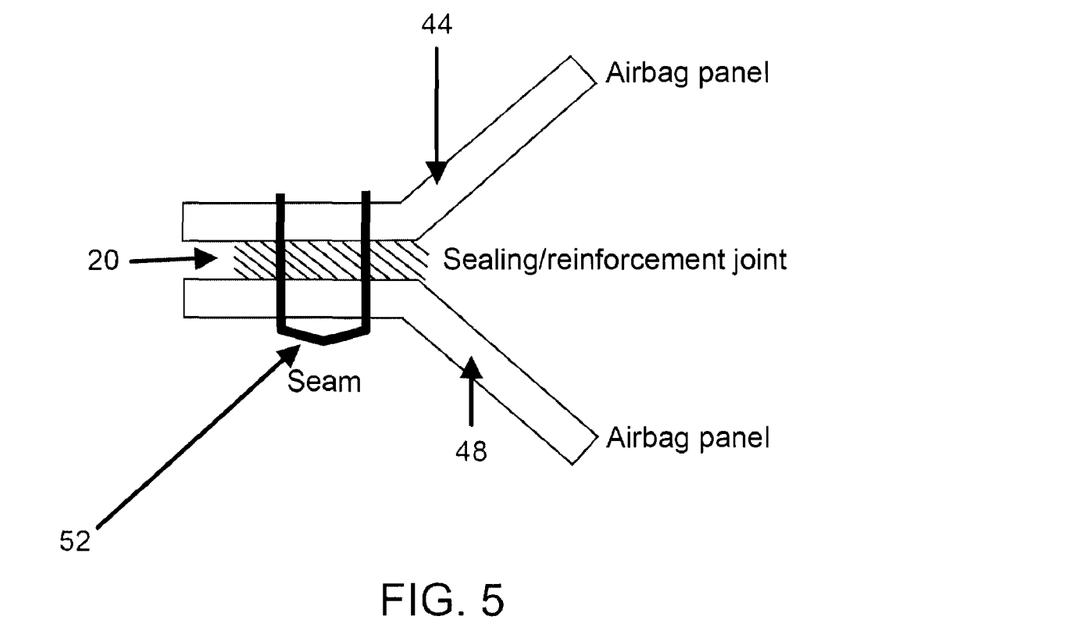
FIG. 5 illustrates positioning of a strip between two panels of an airbag.
Figure 6:
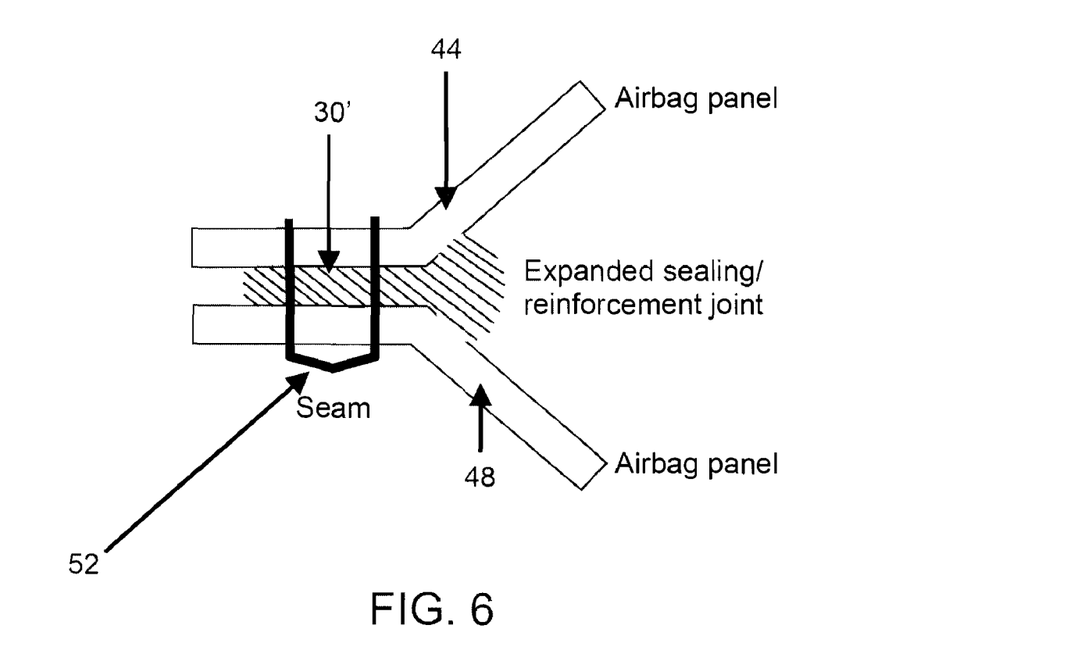
FIG. 6 illustrates positioning of a strip of the invention between two panels of an airbag.

FIG. 5 illustrates strip 20 intended to seal a joint comprising airbag panels 44 and 48 assembled by seam 52. FIG. 6, by contrast, details strip 30' as coated by silicone adhesives of the present invention. Such adhesives enhance bonding of strip 30' and panels 44 and 48 and decrease gas-permeability of the joint.

Silicone adhesives of the present invention may be curable (vulcanizable) by polyaddition reactions (catalysis by platinum or other catalytic metals) so as to permit strong bonding and avoid noxious chemical emissions or odors. Blowing agents may be utilized in formulating the adhesives so as to create a cellular structure (such as that shown in FIG. 6) that expands the area occupied by strip 30' during vulcanization of the joint. Chemical coupling agents or adherence accelerants in the form of organic compounds of titanium or silanes, for example, may also be included.

Figure 7:
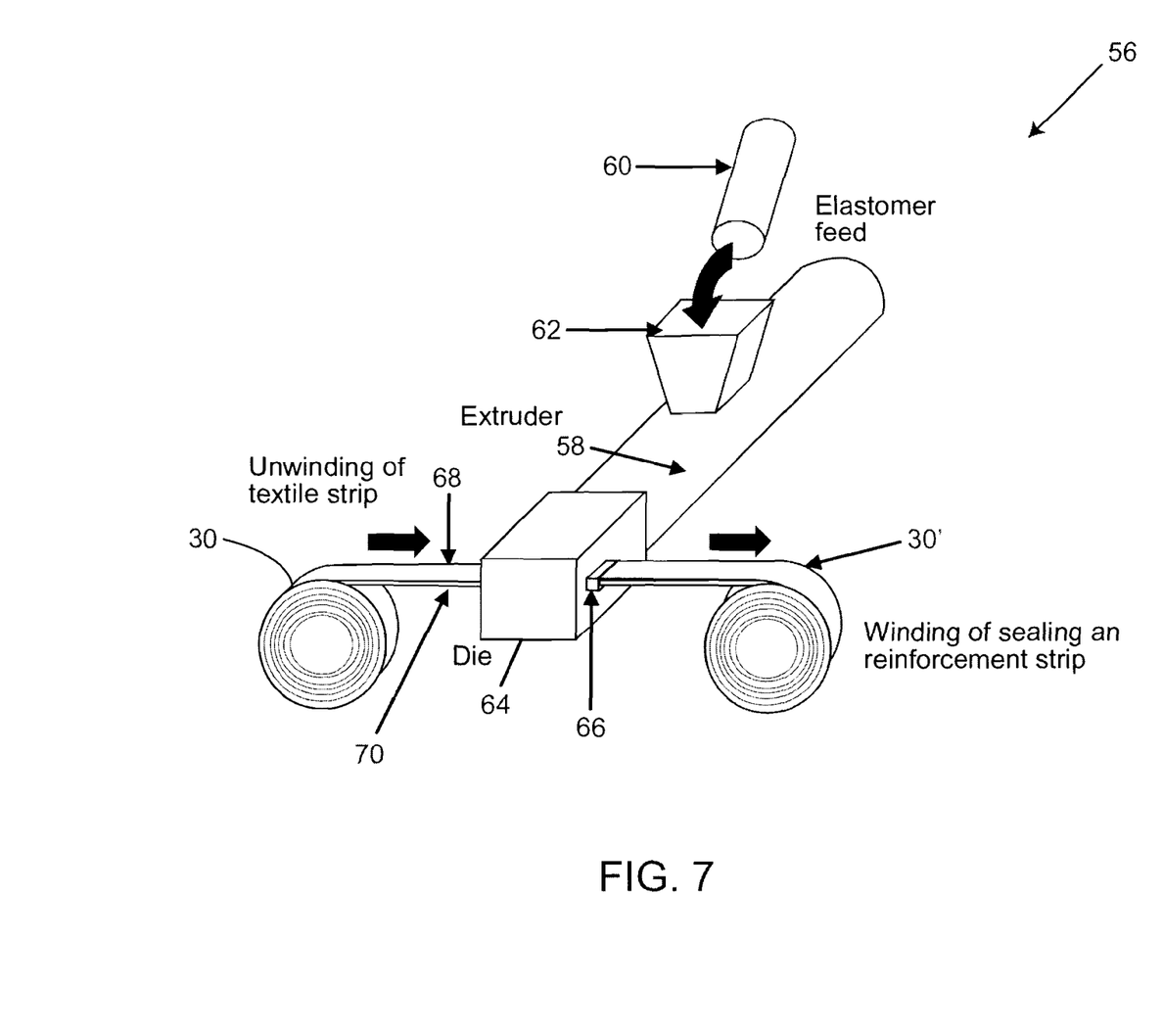
FIG. 7 illustrates an exemplary process for directly extruding a strip of the invention (with silicon on both sides of the strip).

To counteract existing limitations in coating base fabrics with elastomer adhesives, the direct extrusion process depicted in FIG. 7 may be used. FIG. 7 depicts machinery 56, which comprises extruder 58 into which silicone adhesive 60 of the present invention may be input via feeder 62. Machinery 56 also may comprise die 64 including slot 66.

When machinery 56 operates, adhesive 60 may be extruded into strips having width essentially identical to that of strip 30. Meanwhile, strip 30 may be unwound from a roll or otherwise fed into slot 66 through die 64. Within die 64, extruded adhesive 60 is applied to both upper side 68 and lower side 70 of strip 30 to form composite strip 30'. If desired, strip 30' may then be wound into rolls as shown in FIG. 7. This process allows for simultaneous coating of both upper and lower sides 68 and 70 of strip 30 but does not permit simultaneous processing of multiple strips 30.

Figure 8:
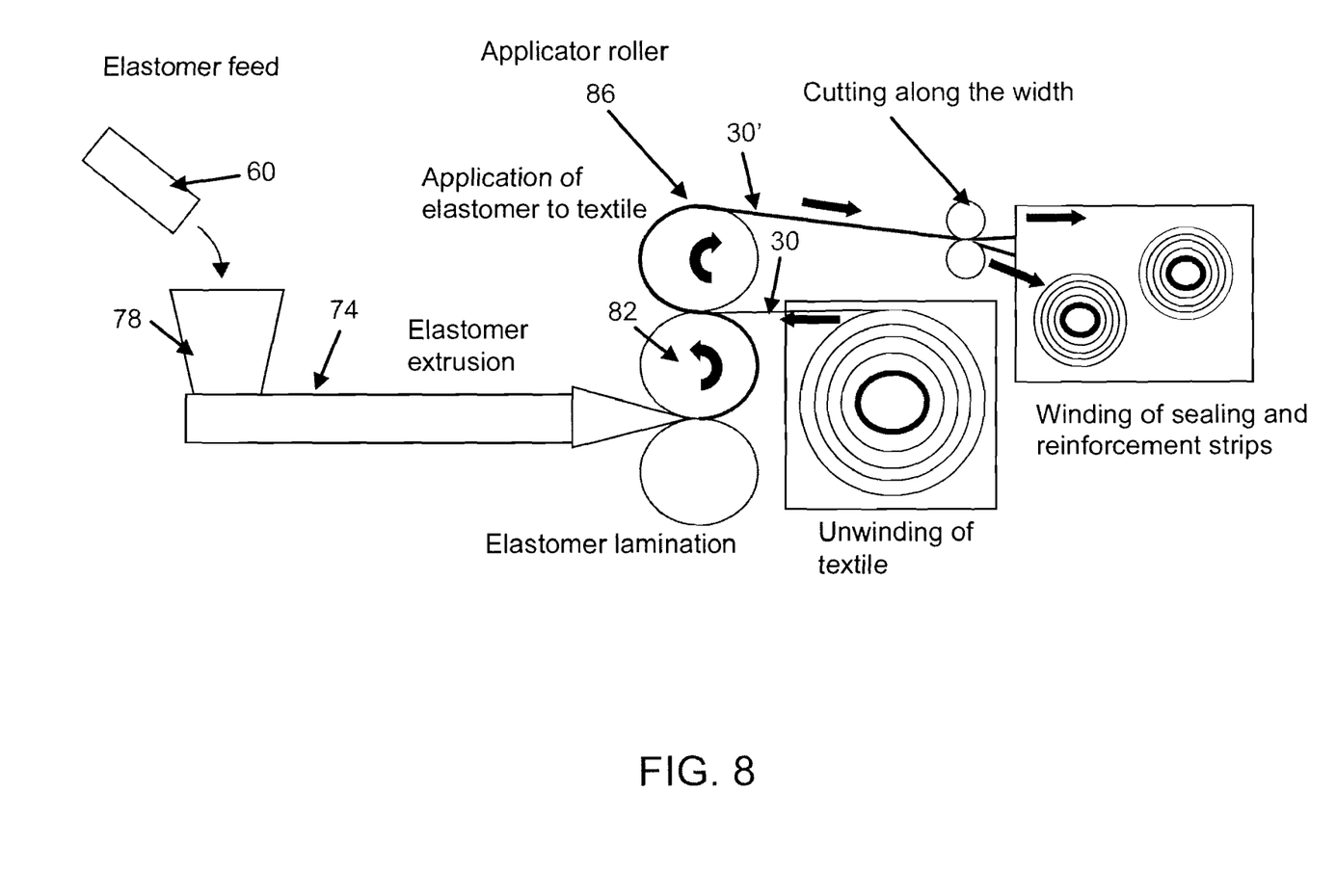
FIG. 8 illustrates an exemplary process for extrusion lamination of a sheet of strips of the invention and cutting the sheet into strips (with silicon on one side).

FIG. 8 illustrates an alternative process for creating strips 30'. Extruder 74 receives adhesive 60 through feeder 78 and extrudes sheets of adhesive 60 onto roller 82, where it may be applied to one side of a sheet of strips 30 being unwound from a roll. Pressure from rollers 82 and 86 cause the application, with regulation of the gap between rollers 82 and 86 and pressure applied by roller 86 helping control thickness of the result and penetration of adhesive 60 into the textile structure of strip 30. Coating of the other side of the sheets of strip 30 may occur in a second pass. Thereafter, the sheet may be cut continuously in the warp direction into strips 30', each of which may be wound onto a spool for use directly in an industrial process of airbag wall joint assembly. Either process of FIG. 7 or FIG. 8 may permit application of adhesive 60 to reach a thickness of approximately 100 μm with precision of approximately 10 μm onto strips 30 with individual widths of a few millimeters to a few centimeters.

Figure 9:
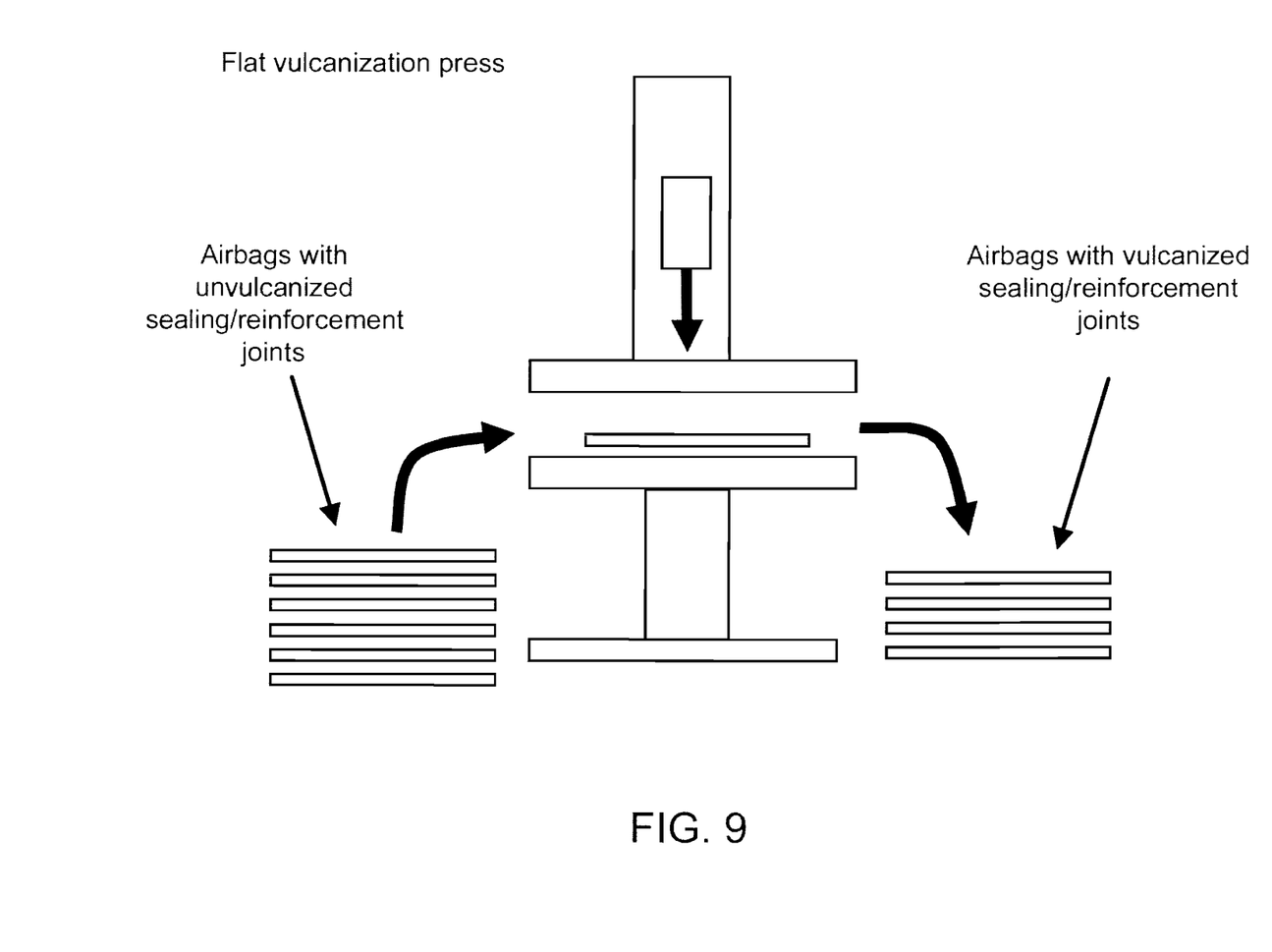
FIG. 9 illustrates a discontinuous (batch) vulcanization process using a flat press.
Figure 10:
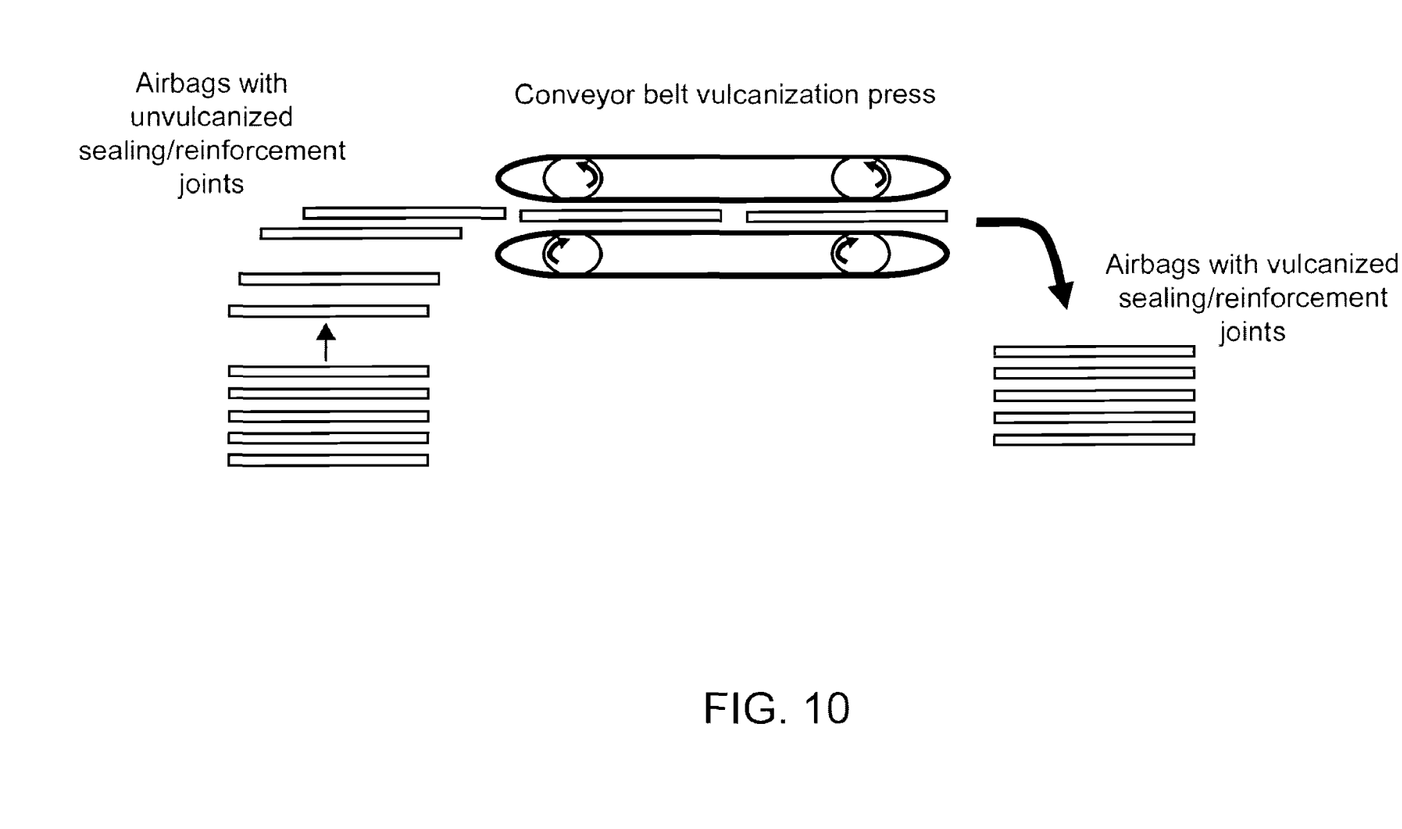
FIG. 10 illustrates a continuous vulcanization process using a conveyor belt.
Figure 12:
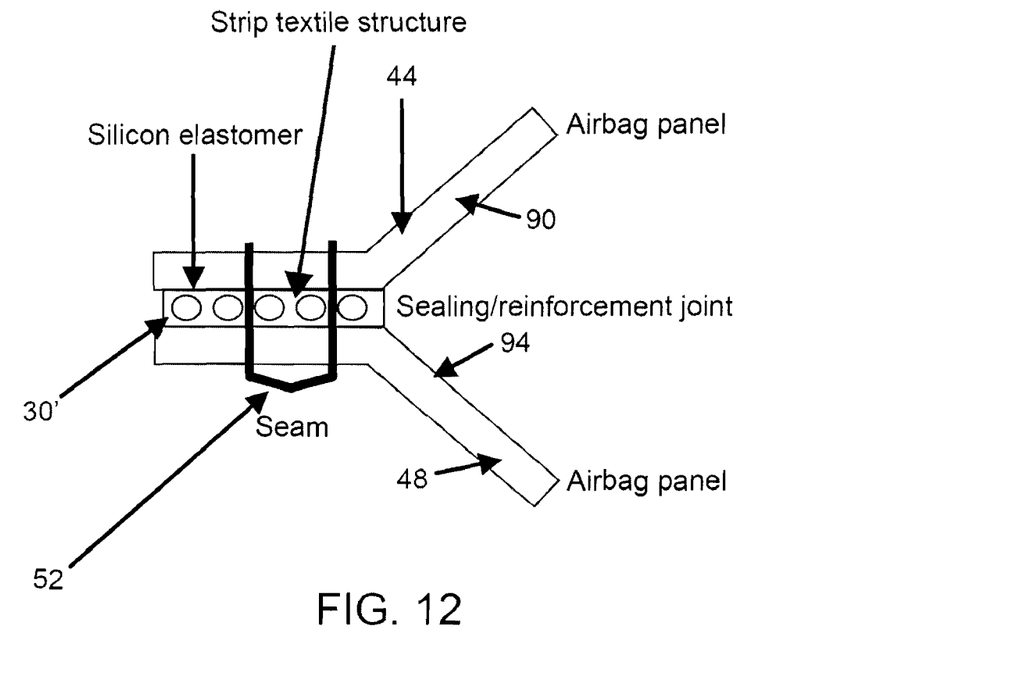
FIG. 12 illustrates positioning a strip of the invention internal to the airbag, with a seam.
Figure 13:
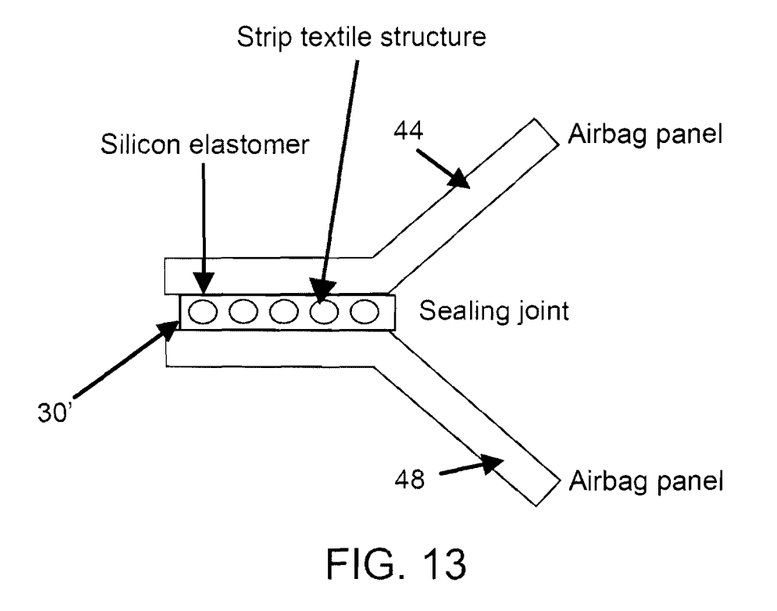
FIG. 13 illustrates positioning a strip of the invention internal to the airbag, without a seam.
Figure 14:
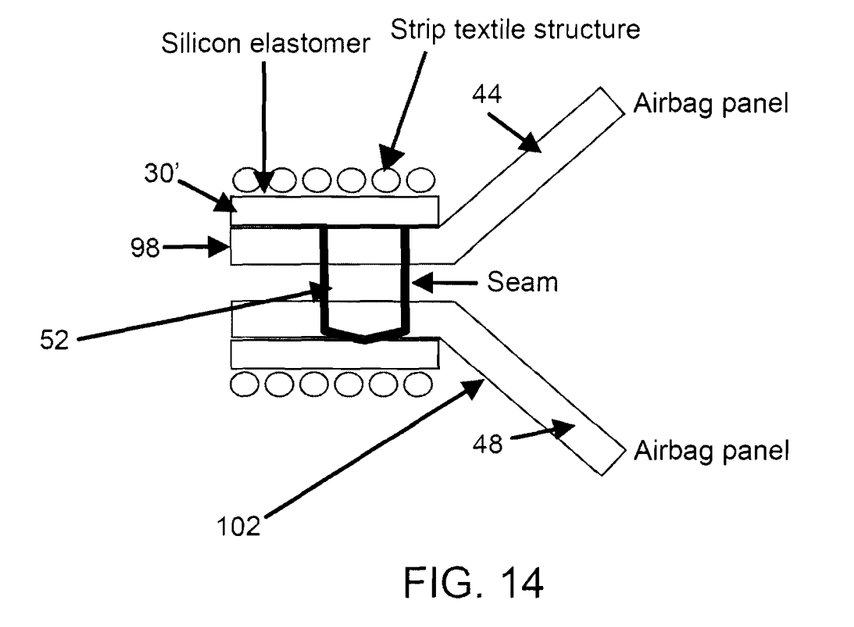
FIG. 14 illustrates positioning a strip of the invention external to the airbag, straddling a seam.
Figure 15:
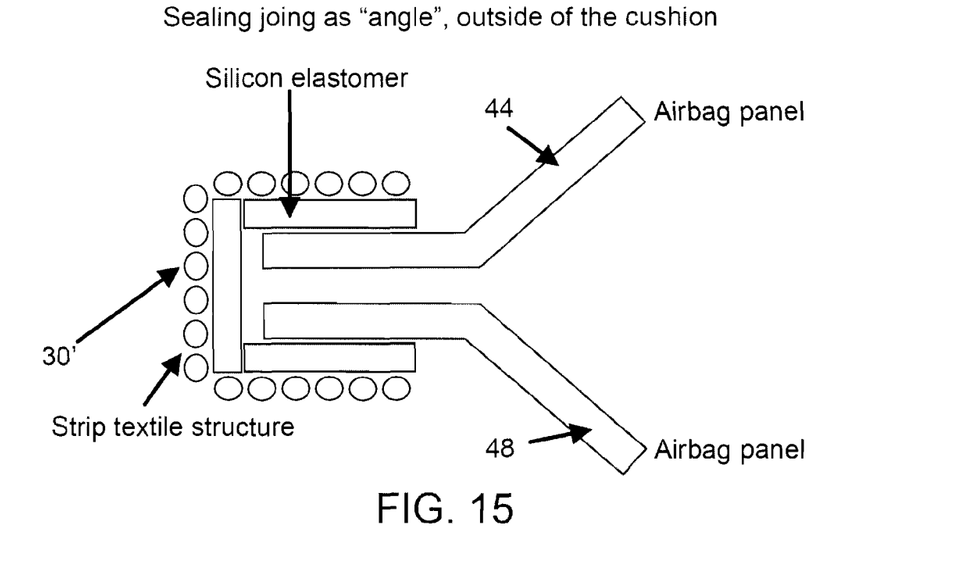
FIG. 15 illustrates positioning a strip of the invention external to the cushion, without a seam.
Figure 16:
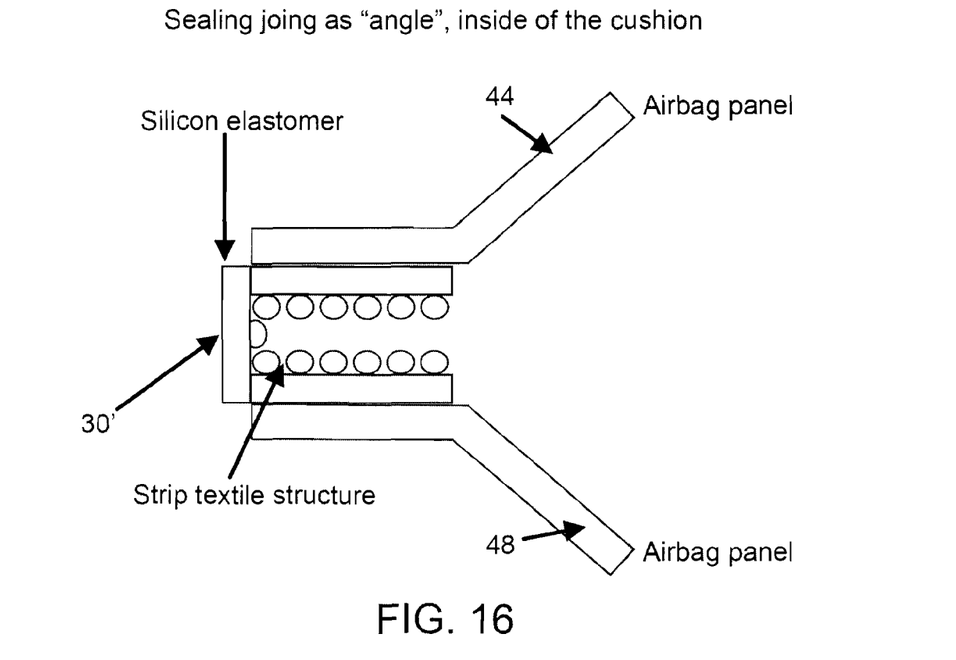
FIGS. 16-17 illustrate positioning strips of the invention internal to the cushion, without seams.
Figure 17:
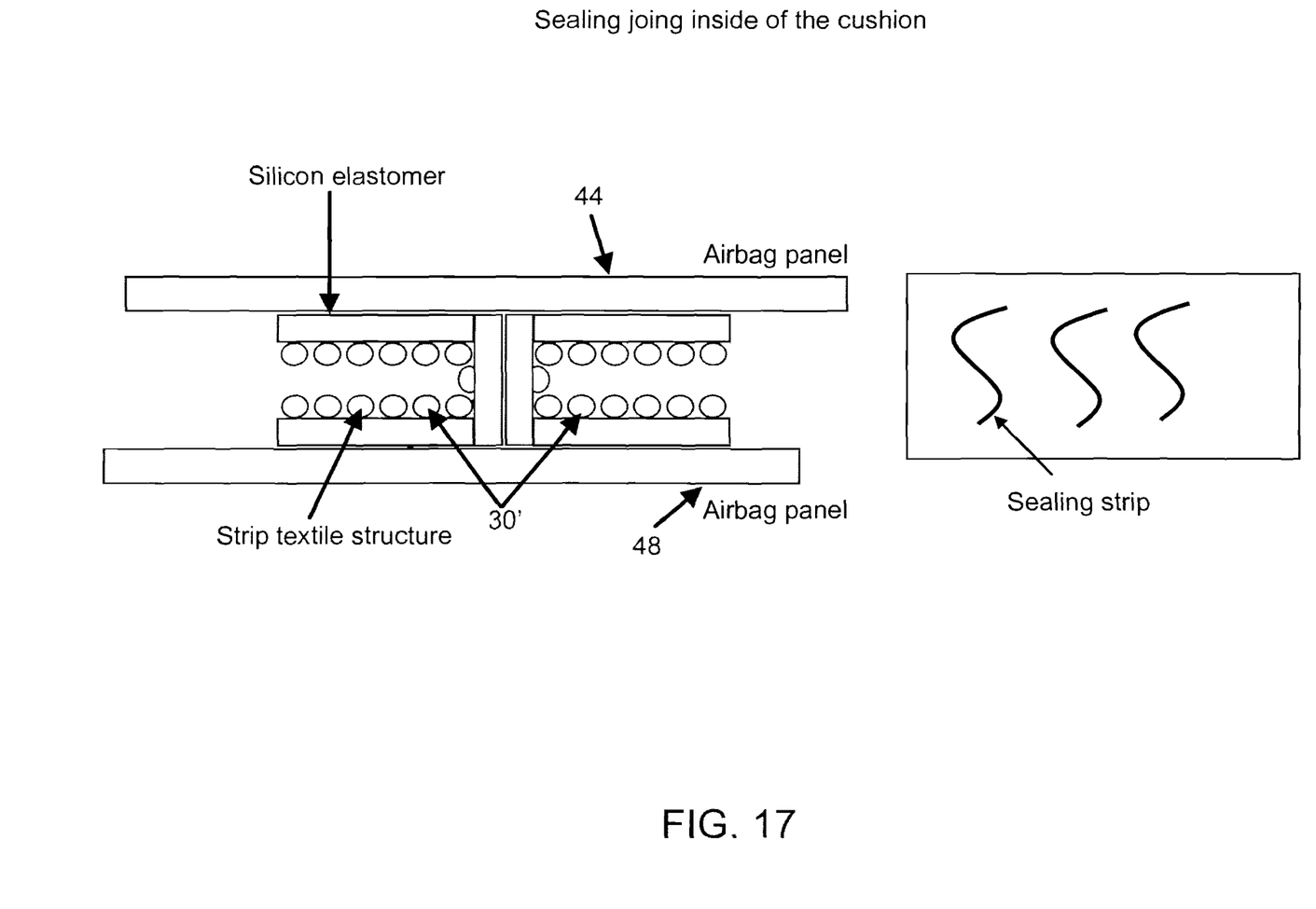

FIGS. 12-17 illustrate various placements of strip 30'. If, for example, reinforcement within an airbag is important, strip 30' may be applied between airbag panels 44 and 48 prior to sewing of seam 52. Such placement is shown in FIGS. 12-13. By contrast, external reinforcement of an airbag may occur by attaching strips 30' during or after sewing of seam 52 into panels 44 and 48 (as depicted in FIG. 14). When assembling a cushion, strip 30' may be applied in an angular fashion (as shown in FIGS. 15-17) either within (FIGS. 16-17) or outside (FIG. 15) the cushion. In each of these cases, vulcanization of adhesive 60, and thereby bonding of strip 30' to panels 44 and 48, may be achieved through action of temperature and pressure via either or both processes illustrated in FIGS. 9-10.

Figure 11:
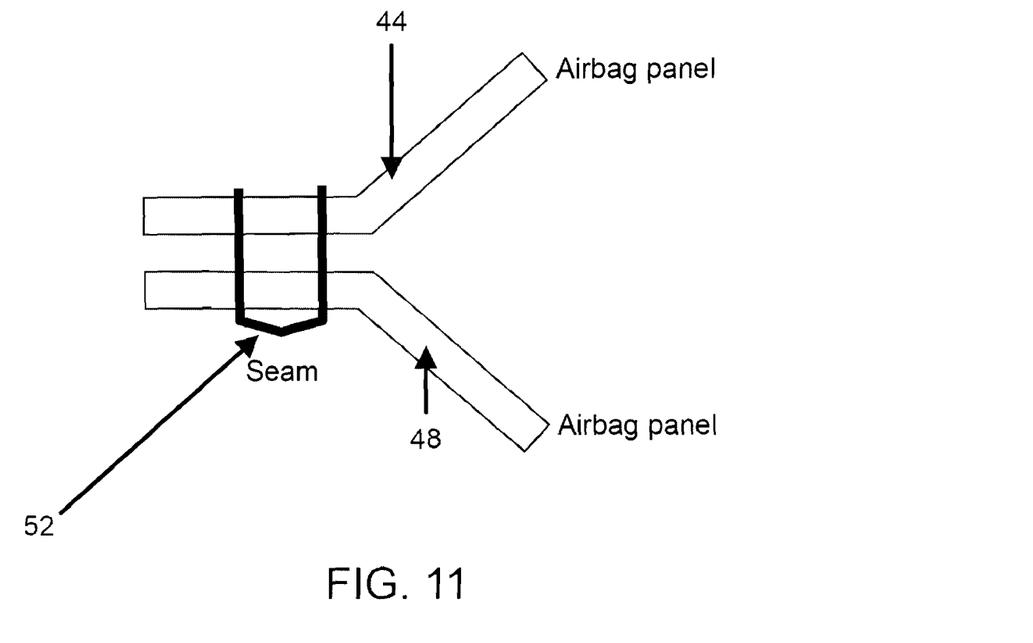
FIG. 11 illustrates a standard assembly of airbag panels by a seam.

FIG. 11 illustrates conventional attachment of panels 44 and 48 by seam 52 (i.e. without strip 30'). As shown in FIG. 12, strip 30' may provide mechanical reinforcement of the airbag by the strength of the bonds between adhesive 60 and respective interior surfaces 90 and 94 of panels 44 and 48. Mechanical resistance of the structure of strip 30 from which composite strip 30' is formed additionally may provide reinforcement to the airbag.

In each of FIGS. 13 and 15-17 is depicted an assembly lacking any seam 52. In these joints, strip 30' itself adequately attaches panels 44 and 48 so that no seam 52 is necessary. Of course, such a seam 52 may be added if desired, however. FIG. 14, finally, details strip 30' straddling seam 52 and bonded both to the seam 52 and external surfaces 98 and 102 of respective panels 44 and 48. In this configuration, strip 30' well limits gas leaks when the airbag is pressurized.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An airbag comprising:
   a. a first panel;
   b. a second panel; and
   c. a strip joining the first and second panels and comprising a material highly deformable in the weft direction, not substantially deformable in the warp direction, and having first and second sides.

2. An airbag according to claim 1 further comprising a seam sewn into the first and second panels.

3. An airbag according to claim 1 in which each of the first and second panels has an interior surface and the strip joins the interior surfaces of the first and second panels.

4. An airbag according to claim 1 in which each of the first and second panels has an exterior surface and the strip joins the exterior surfaces of the first and second panels.

5. An airbag according to claim 1 in which the strip further comprises silicone elastomer coated onto at least one of the first and second sides.

6. An airbag according to claim 5 in which the silicone elastomer is curable through vulcanization.

7. An airbag according to claim 6 in which the strip is vulcanized by polyaddition reaction.

8. An airbag according to claim 5 in which the silicone elastomer is extruded onto the first side of the material.

9. An airbag according to claim 8 in which the silicone elastomer is extruded onto the second side of the material.

10. An airbag according to claim 1 in which the material is formed by knitting, warp knitting, braiding, or weaving.

* * * * *